United States Patent
Shimmitsu (10) Patent No.: US 7,587,631 B2
(45) Date of Patent: Sep. 8, 2009

(54) RAID CONTROLLER, RAID SYSTEM AND CONTROL METHOD FOR RAID CONTROLLER

(75) Inventor: Masaru Shimmitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 11/607,843

(22) Filed: Dec. 4, 2006

(65) Prior Publication Data
US 2008/0010500 A1    Jan. 10, 2008

(30) Foreign Application Priority Data
Jun. 14, 2006  (JP) .............................. 2006-165009

(51) Int. Cl.
*G06F 11/00*  (2006.01)
(52) U.S. Cl. .......................................... 714/7
(58) Field of Classification Search .................. 714/5–8
See application file for complete search history.

(56) References Cited

U.S. PATENT DOCUMENTS

| | | | | |
|---|---|---|---|---|
| 5,146,571 A | * | 9/1992 | Logan | 714/8 |
| 5,729,552 A | * | 3/1998 | Yorimitsu | 714/718 |
| 6,546,499 B1 | * | 4/2003 | Challener et al. | 714/6 |
| 6,883,062 B2 | * | 4/2005 | Susnjar | 711/112 |
| 6,912,614 B2 | * | 6/2005 | Tomita | 711/4 |
| 7,143,305 B2 | * | 11/2006 | Hajji et al. | 714/2 |
| 7,472,223 B1 | * | 12/2008 | Ofer | 711/112 |
| 2002/0188768 A1 | * | 12/2002 | Hirakawa et al. | 710/8 |
| 2004/0268179 A1 | * | 12/2004 | Stewart | 714/8 |
| 2007/0300101 A1 | * | 12/2007 | Stewart | 714/8 |

FOREIGN PATENT DOCUMENTS

| | | |
|---|---|---|
| JP | 04-153727 | 5/1992 |
| JP | 5-109192 | 4/1993 |

* cited by examiner

*Primary Examiner*—Bryce P Bonzo
(74) *Attorney, Agent, or Firm*—Staas & Halsey LLP (57) ABSTRACT

With respect to each head mounted on a hard disk, an area accessed by the head is obtained in advance and managed as disk information. Then, if a read error or a write error has occurred during operation, the corresponding head is identified on the basis of a logical block address at which the error has occurred. If a read error or a write error caused by the identified head has occurred multiple times, only data stored in an area accessed by the head is transferred to another hard disk. After the completion of the data transfer, the hard disk with the failed head and the other hard disk serving as the destination of the data transfer are used as hard disks constituting the same RAID array.

8 Claims, 9 Drawing Sheets

| HDD No. | HEAD No. | LBA | HDD No. | HEAD No. | LBA |
|---|---|---|---|---|---|
| 31 | 0 | 0x00000000 – 0x000000FF | 32 | 0 | 0x00000000 – 0x000000FF |
| 31 | 1 | 0x00000100 – 0x000001FF | 32 | 1 | 0x00000100 – 0x000001FF |

FIG. 3

| HDD | THRESHOLD VALUE | NUMBER OF ERRORS ||
| --- | --- | --- | --- |
| | | HEAD No.0 | HEAD No.1 |
| 31 | 5 | 4 | 0 |
| 32 | 5 | 0 | 0 |
| | | | |

| SERVER-LBA | | HDD31-LBA | HDD32-LBA |
|---|---|---|---|
| LB0(A) : | 0x00000000 | 0x00000000 | 0x00000000 |
| LB1(B) : | 0x00000001 | 0x00000001 | 0x00000001 |
| LB100(C) : | 0x00000100 | 0x00000100 | 0x00000100 |
| LB101(D) : | 0x00000101 | 0x00000101 | 0x00000101 |

RAID CONTROLLER, RAID SYSTEM AND CONTROL METHOD FOR RAID CONTROLLER

BACKGROUND OF THE INVENTION

1. Field of the Invention

The present invention relates to a redundant array of inexpensive disks (RAID) controller for controlling multiple storage-devices constituting a RAID array.

2. Description of the Related Art

As the capacity of hard disks is increasing rapidly, the extent of damage caused by hard disk failures is increasing. RAID technology is used to prevent data loss caused by hard disk failures and to improve processing performance.

RAID technology provides techniques for combining multiple hard disks and managing them as a redundant single hard disk. The techniques are categorized into six levels RAID 0 through 5 according to the method of data arrangement on the hard disks and the method of providing data redundancy.

For example, RAID 1 allows data to be simultaneously written to two or more hard disks. Therefore, RAID 1 is also referred to as "mirroring".

If one hard disk fails, RAID 1 allows automatic switching from the failed hard disk to another hard disk on which data can be processed, and thus enables the ongoing operation to continue. RAID 1 cannot improve access speed, but has advantages that it can prevent data loss and system failures caused by disk failures.

If a hard disk in a RAID 1 array fails and needs to be replaced, data stored on this failed hard disk has to be copied to a backup hard disk.

This involves reading of data stored in all areas of a properly functioning hard disk in the RAID 1 array, and writing of the read data to the backup hard disk.

If access from a high-level device (e.g., server) continues during this data transfer, the access from the server and the data transfer are carried out in parallel with each other. This causes degradation in the access performance of the server.

Moreover, since the amount of time required for data transfer associated with the replacement of a hard disk increases in proportion to the capacity of the hard disk, the estimated period of time during which the access performance of the server is degraded also increases in proportion to the capacity of the hard disk.

SUMMARY OF THE INVENTION

An object of the present invention is to provide a RAID controller that can transfer, if a specific head has caused an error, only data in a data area accessed by the specific head at which the error has been detected to a backup storage device. Another object is to provide a RAID system having the RAID controller.

According to an aspect of the present invention, if an error has been detected during access to a storage device, a RAID controller for controlling multiple storage devices constituting a RAID array determines whether the detected error is a predetermined error. If the detected error is a predetermined error, the RAID controller identifies a head at which the error has occurred. Then, the RAID controller obtains an access area accessed by the identified head, copies data in the obtained access area to a backup storage device, and thus reconfigures the RAID array.

Since this configuration eliminates the need for the replacement of a failed storage device, the amount of time required for recovery becomes shorter than before. Moreover, degradation in the performance of a server connected to a RAID system can be reduced.

DESCRIPTION OF THE PREFERRED EMBODIMENTS

First Embodiment

Figure 1:
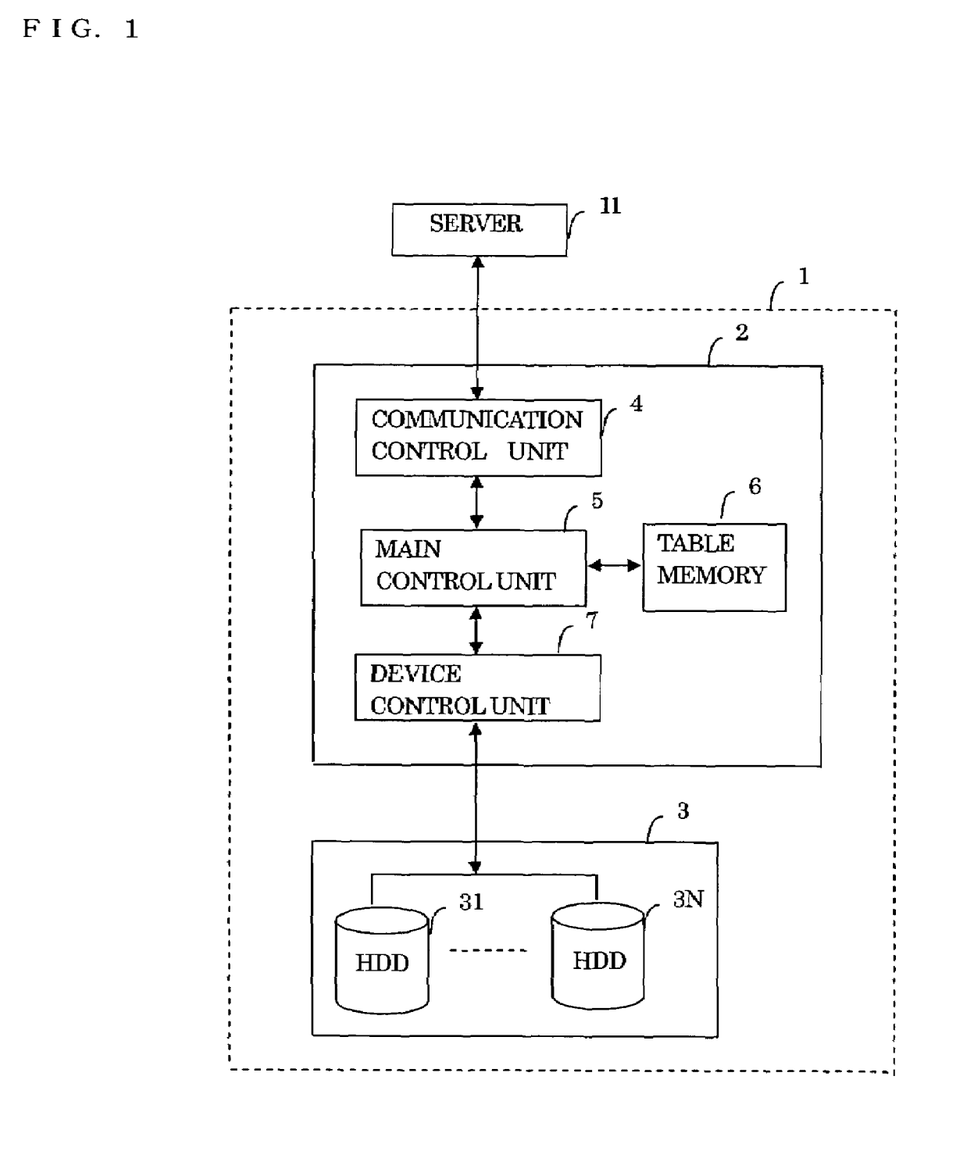
FIG. 1 is a block diagram of a RAID system.

FIG. 1 is a block diagram of an embodiment. A RAID system 1 includes a RAID controller 2 and a disk array 3.

The RAID controller 2 includes a communication control unit 4, a main control unit 5, a table memory 6, and a device control unit 7.

The disk array 3 contains multiple hard disks (HDDs) 31 through 3N (N: integer). For example, if N=3 is true for FIGS. 6A or 6B, the HDD 31, HDD 32, and HDD 33 are used in a RAID 1 configuration. However, the HDD 31 through HDD 33 are viewed as a single HDD by a server 11.

In this example, the HDD 31 is a HDD to or from which data is written or read by the server. The HDD 32 is a mirror HDD, which is a copy of the HDD 31. The HDD 33 is a backup HDD.

The communication control unit 4 performs control for data transfer between the server 11 and the RAID controller 2.

The main control unit 5 performs data read/write processing in response to a command from the server 11. In response to a write command from the server 11, the main control unit 5 performs write control for the writing of data to the disk array 3. In response to a read command from the server 11, the main control unit 5 performs read control such that data corresponding to the command is read from the disk array 3 and transmitted to the server 11. Additionally, if a read/write error occurs in the disk array 3, the main control unit 5 performs data recovery and reconfigures a RAID configuration. Therefore, the main control unit 5 determines whether an error having occurred during read/write processing is a read/write error, identifies a head at which a read/write error has occurred, obtains an access area on a medium accessed by the identified head, copies data in the obtained access area to a backup HDD, and thus reconfigures a RAID configuration.

The table memory 6 stores a head number management table 61, a head error management table 62, a transfer data management table 63, and an address translation table 64.

Figure 2:
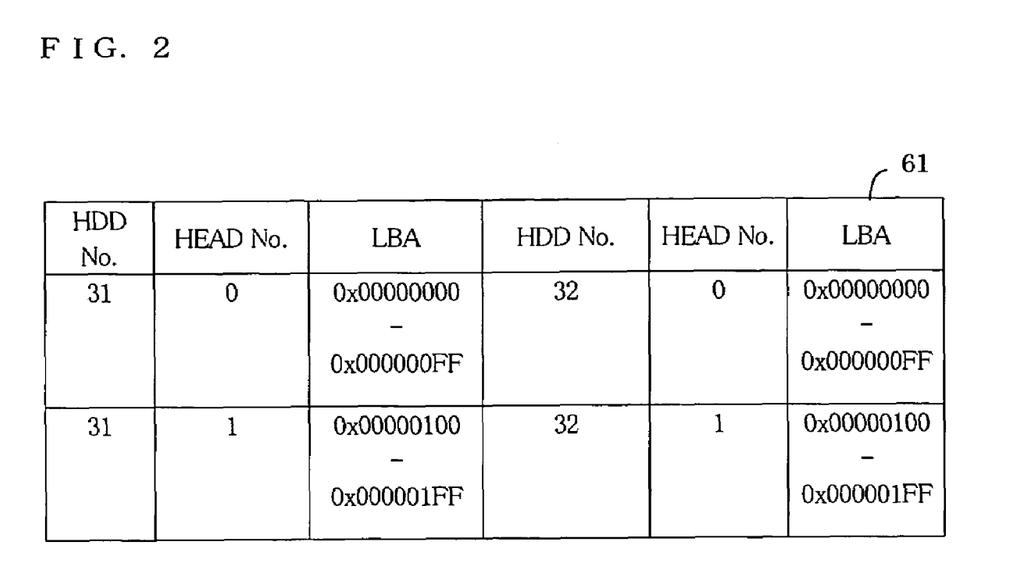
FIG. 2 illustrates an exemplary head number management table.

FIG. 2 illustrates an exemplary head number management table. The head number management table 61 is a database of access areas of the HDD 31 and HDD 32. With respect to every head in each HDD, an access area on the medium to be accessed by the head is managed as a database. That is, heads and their corresponding logical block addresses (LBAs) on the HDD 31 and HDD 32 are shown in the head number management table 61. FIG. 2 shows as an example the correspondence of head number 0 and LBAs and the correspondence of head number 1 and LBAs, with respect to each of the HDD 31 and HDD 32. Each LBA indicates a data storage location on the HDD 31 or HDD 32.

Figure 3:
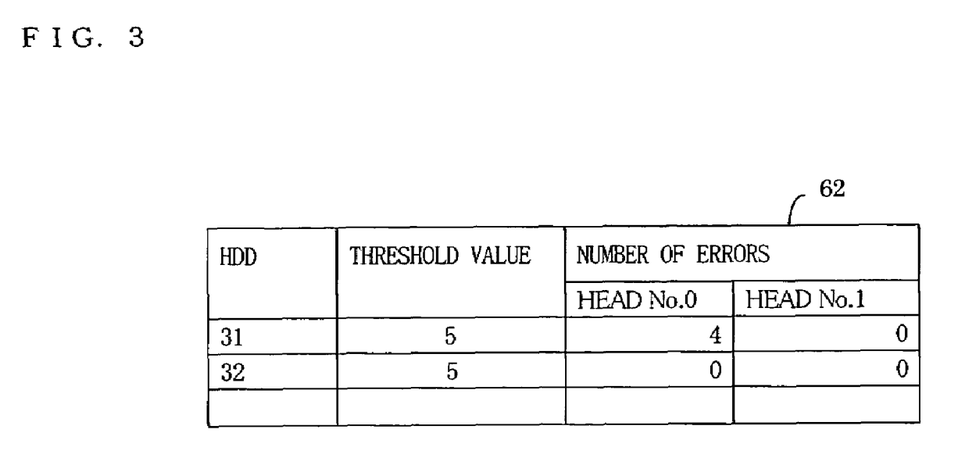
FIG. 3 illustrates an exemplary head error management table.

FIG. 3 illustrates an exemplary head error management table. For each of the HDD 31 and HDD 32, the head error management table 62 stores a threshold value for the determination of failure, and the number of errors (i.e., error count) with respect to each head number of a head at which an error has occurred. FIG. 3 shows as an example that threshold values for both the HDD 31 and HDD 32 are set at "5", an error count for head number 0 on the HDD 31 is "4", and error counts for the other heads are "0".

Figure 4A:
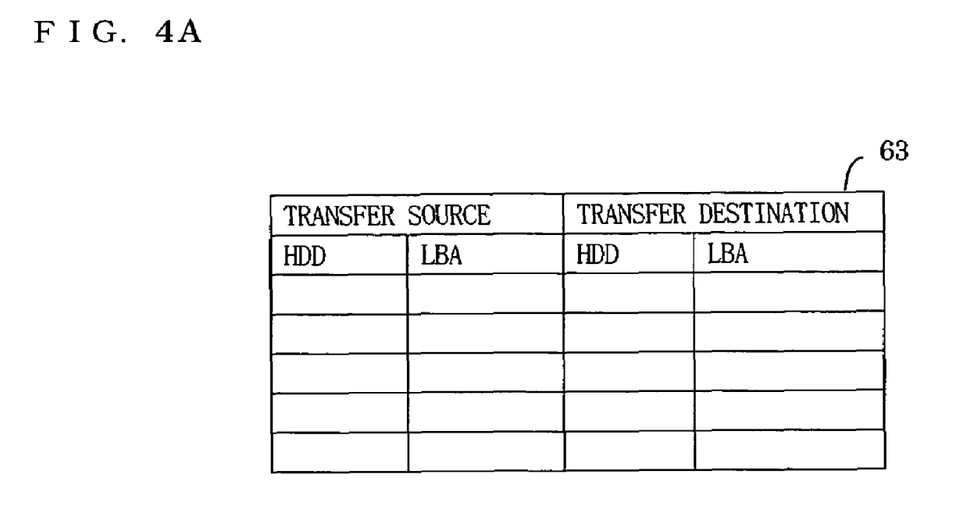
FIG. 4A and FIG. 4B illustrate exemplary transfer data management tables.
Figure 4B:
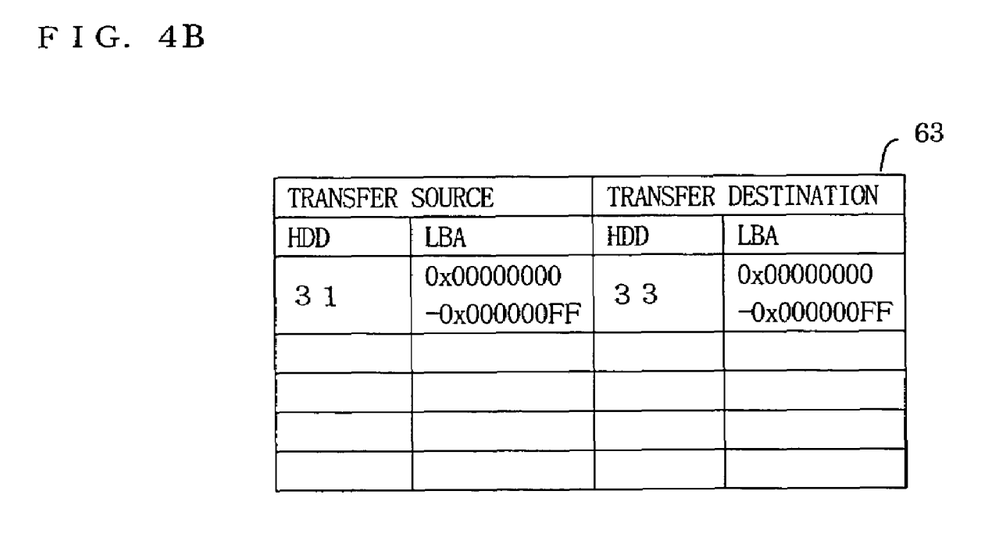

FIG. 4A and FIG. 4B illustrate exemplary transfer data management tables. The transfer data management table 63 stores the correspondence of the device number of a transfer source HDD from which data is transferred, LBAs indicating a data storage area on the transfer source HDD, the device number of a transfer destination HDD to which data is transferred, and LBAs indicating a data storage area on the transfer destination HDD.

Figure 5:
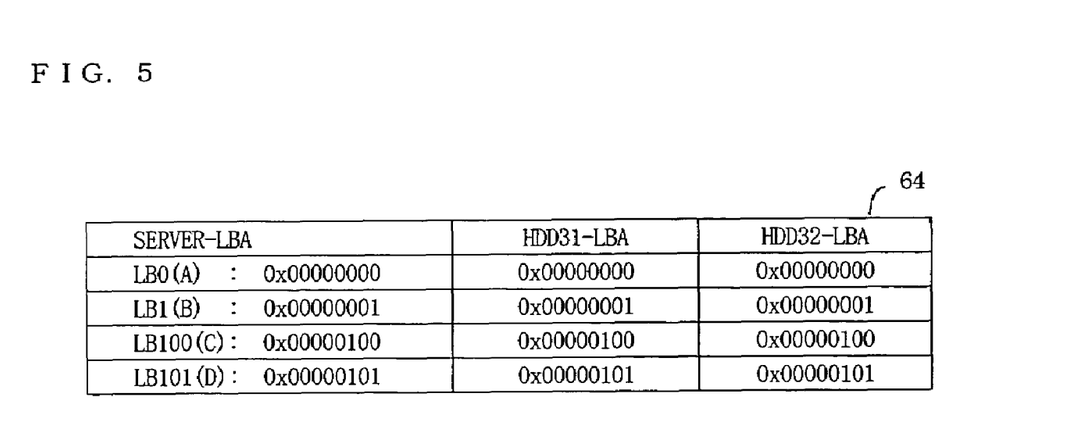
FIG. 5 illustrates an exemplary address translation table.

FIG. 5 illustrates an exemplary address translation table. The address translation table 64 shows the correspondence of an LBA from the server 11, an LBA on the HDD 31, and an LBA on the HDD 32. FIG. 5 shows an example in which an LBA from the server 11, an LBA on the HDD 31, and an LBA on the HDD 32 are the same.

The device control unit 7 performs read/write control for the reading or writing of data from or to the disk array 3.

Figure 6A:
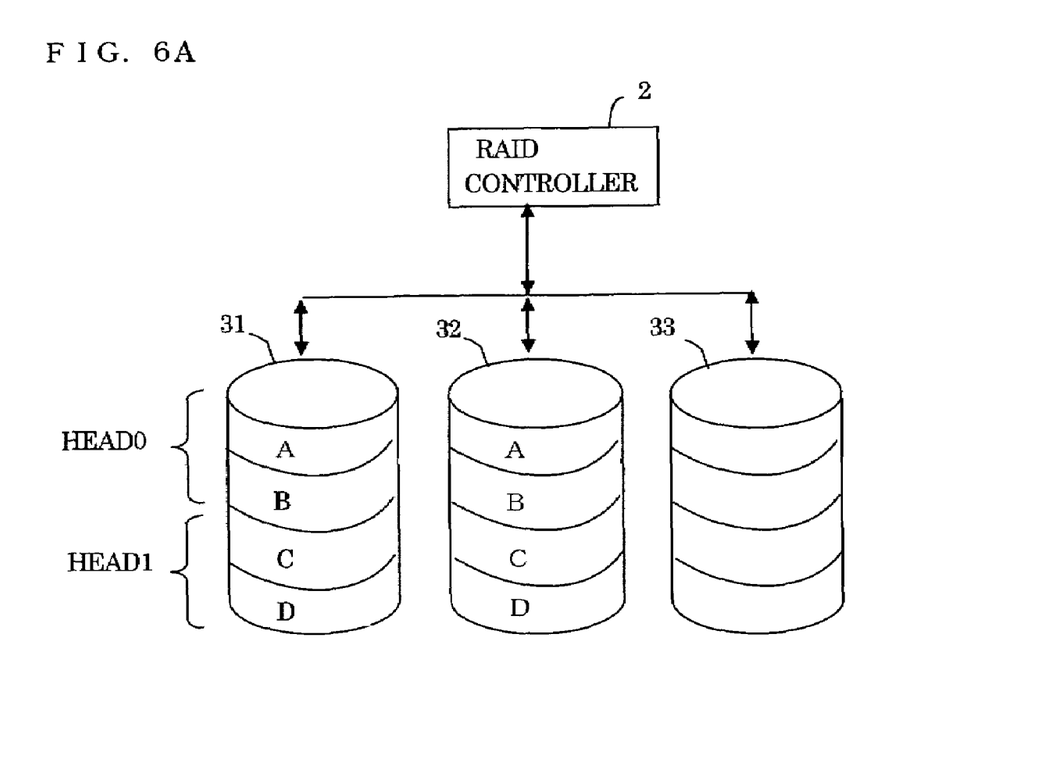
FIG. 6A and FIG. 6B are schematic diagrams illustrating disk arrays.
Figure 6B:
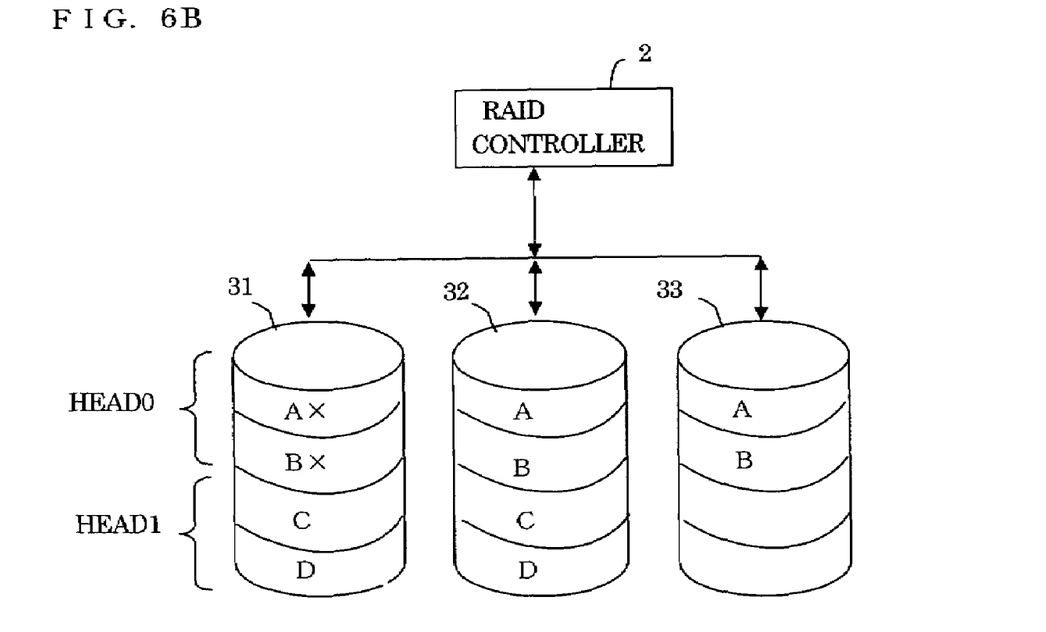

FIG. 6A and FIG. 6B are schematic diagrams illustrating disk arrays. A system illustrated in FIG. 6A and FIG. 6B has a RAID 1 configuration with the HDD 31, HDD 32, and HDD 33. The HDD 31 and the HDD 32 are hard disks for storing data, and the HDD 33 is a hard disk for backup. In response to a write command from the server 11, data is simultaneously written to the HDD 31 and HDD 32. FIG. 6A illustrates an example in which data A and B are stored in a location indicated by head number 0, and data C and D are stored in a location indicated by head number 1. In this example, the HDD 31 and HDD 32 store the same data at the same LBAs. Data transmission to and from the server 11 is normally carried out by the HDD 31. If a failure occurs, the HDD 32 is used in place of the HDD 31.

Figure 7:
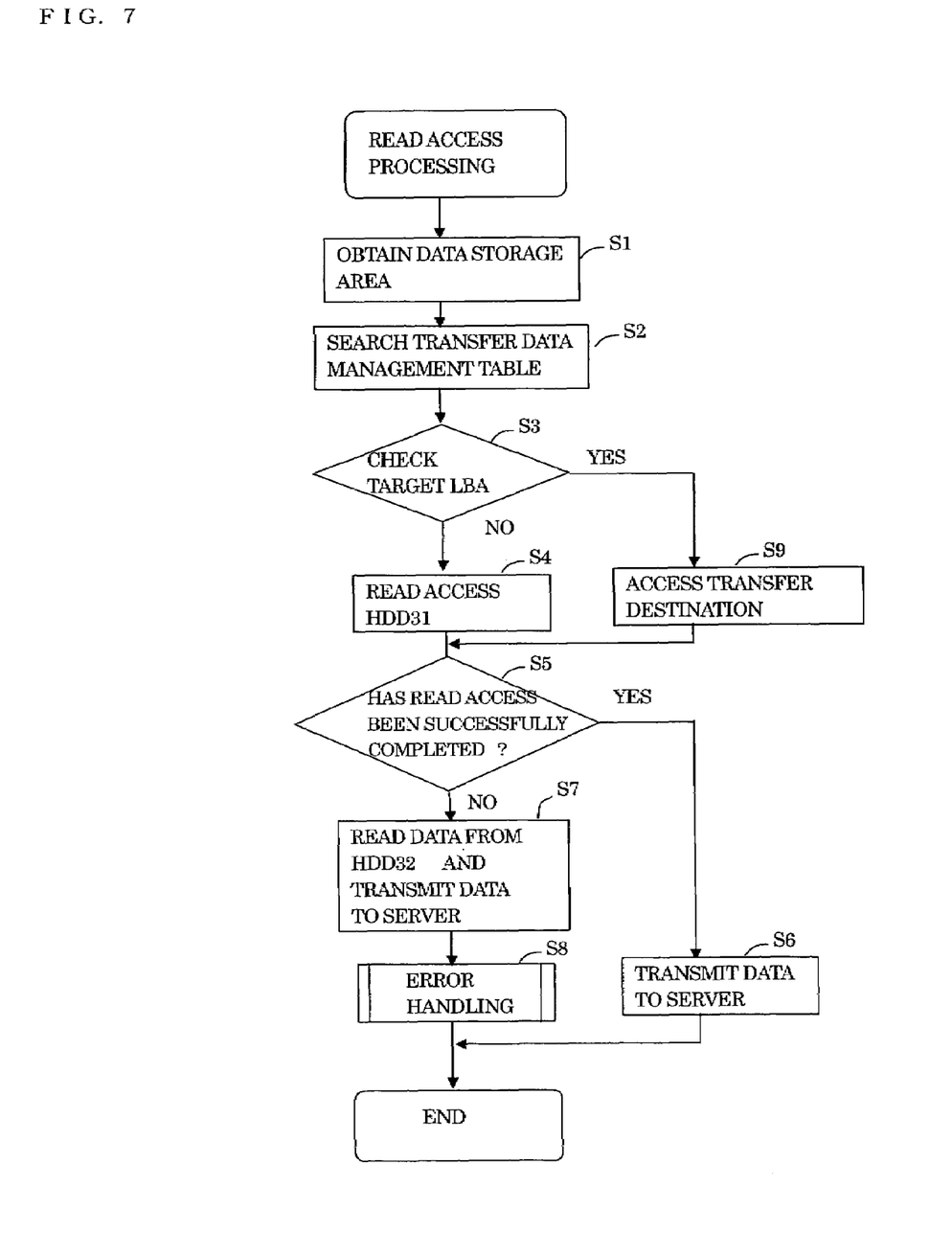
FIG. 7 is a flowchart illustrating read access processing.

FIG. 7 is a flowchart illustrating read access processing.

When the RAID controller 2 receives a read command from the server 11, the main control unit 5 performs read access to the disk array 3.

For example, the RAID controller 2 receives from the server 11 a read command for reading data at logical block address LB0. In the example of FIG. 6A, data A through D from the host are already stored on the HDD 31 and HDD 32. In an access area corresponding to head number 0, data A is stored at 0x00000000 and data B is stored at 0x00000001. In an access area corresponding to head number 1, data C is stored at 0x00000100 and data D is stored at 0x00000101. Read access processing will now start.

The main control unit 5 searches the address translation table 64 of FIG. 5 to obtain a data storage area corresponding to LB0 (step S1). LB0 corresponds to 0x00000000 on the HDD 31.

Next, the main control unit 5 searches the transfer data management table 63 of FIG. 4A for LBA 0x00000000 on the HDD 31 (step S2).

Next, it is checked whether the target LBA has been found (step S3).

If the target LBA has been found, the main control unit 5 accesses a transfer destination (step S9). Then, the process proceeds to step S5.

If the target LBA is not stored in the transfer data management table 63, the main control unit 5 performs read access via the device control unit 7 to 0x00000000 on the HDD 31 (step S4).

Next, it is checked whether the read access has been successfully completed (step S5).

If data A has been able to be successfully read from the disk array 3, the main control unit 5 transmits the read data A via the communication control unit 4 to the server 11 (step S6).

On the other hand, if data A has failed to be successfully read from the HDD 31, the main control unit 5 switches the read target HDD to the HDD 32 for the purpose of data recovery. Then, from the address translation table 64, the main control unit 5 obtains the LBA on the HDD 32 corresponding to LB0 from the server 11. Since the LBA on the HDD 32 is 0x00000000, the main control unit 5 performs read access to this address. If data A has been able to be successfully read, the main control unit 5 transmits the read data A via the communication control unit 4 to the server 11 (step S7). On the other hand, if data A has failed to be successfully read, it is determined that a failure has occurred. Then, the main control unit 5 performs error handling (step S8).

Figure 8:
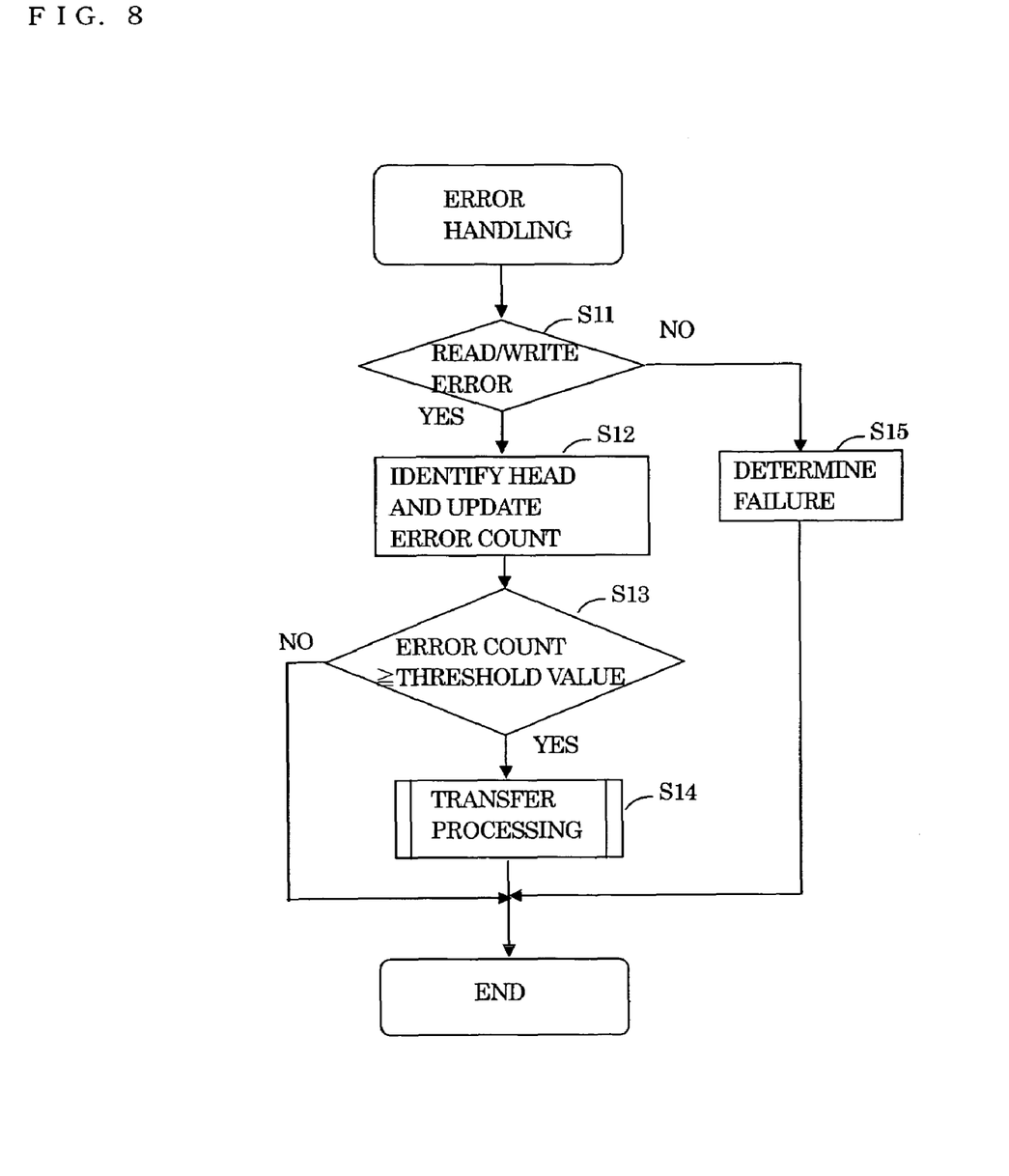
FIG. 8 is a flowchart illustrating error handling.

FIG. 8 is a flowchart illustrating the error handling.

The main control unit 5 checks the error to determine whether a predetermined error has occurred (step S11). Specifically, the main control unit 5 checks status information.

If the status information indicates that a read error or a write error has occurred, the main control unit 5 identifies the head number corresponding to LBA 0x00000000 on the HDD 31 to which read access has been performed. The main control unit 5 refers to the head number management table 61 of FIG. 2 to identify the head number. A read error or a write error is caused by a problem associated with a medium or a head. Since retries are carries out in the HDD 31, the main control unit 5 monitors a read error or a write error that has not been able to be corrected by the retries. If such a read error or a write error has occurred a predetermined number of times at the same head, the main control unit 5 determines that a head error has occurred. In the present embodiment, if a read error or a write error has occurred five times, the main control unit 5 determines that a head error has occurred.

From an index of the head number management table 61, it can be identified that LBA 0x00000000 on the HDD 31 corresponds to head number 0 on the HDD 31. Next, the error count, which is currently "4", in the head error management table 62 is updated to "5" and registered (step S12).

Next, in the head error management table 62, the error count corresponding to the head number of the identified head is compared with a preset threshold value (step S13). If the error count is below the preset threshold value, the head is continued to be used. This is because, in the case of a read error caused by dust, the read error can be corrected by moving the head. Also, in the case of a write error, data is written to an alternative block and thus no problem occurs even if data cannot be written to the same location on the medium.

On the other hand, if the error count is equal to or larger than the threshold value, use of the head with head number 0 is terminated. This is because if the number of times an error occurs is equal to or larger than the threshold value, it is determined that the medium or the head is defective.

Next, processing for obtaining an access area accessed by the head with head number 0 is performed. Then, data stored in the obtained area is transferred to the backup HDD 33 (step S14). If this data transfer has been successfully completed, a RAID configuration is reconfigured.

In the exemplary head error management table 62, head number 0 on the HDD 31 corresponds to a threshold value of 5 and an error count of 5. Therefore, it is necessary that data stored in the area accessed by the corresponding head be transferred to the backup HDD 33.

On the other hand, in the case of an unrecoverable error that is not either a read error or a write error, the main control unit 5 determines that the HDD 31 fails (step S15). In this case, the HDD 31 is replaced with a new one. Examples of such an unrecoverable error include a spindle motor failure.

Figure 9:
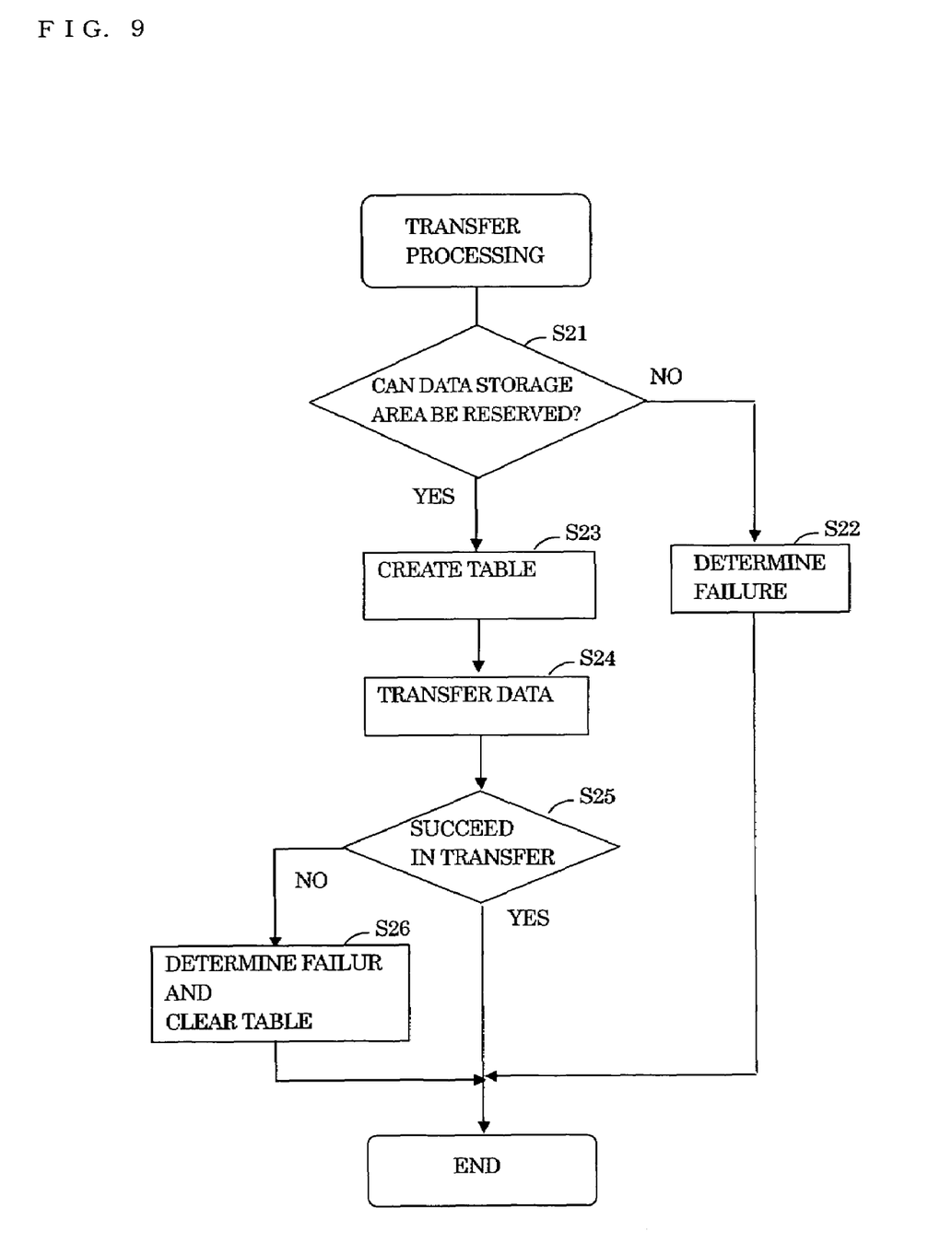
FIG. 9 is a flowchart illustrating transfer processing.

FIG. 9 is a flowchart illustrating transfer processing. Data transfer to the backup HDD 33 is carried out according to the following steps.

First, the amount of target data to be transferred is determined. Then, it is determined whether a data storage area for storing the target data can be reserved on the backup HDD 33 (step S21). If a data storage area that satisfies certain criteria cannot be reserved on the HDD 33, it is determined that the HDD 31 fails and the data transfer processing is terminated (step S22).

On the other hand, if a storage area that can store the target data can be reserved, it is determined to perform the data transfer. In the example of FIG. 6A where the backup HDD 33 is empty and a storage area can be reserved, transfer processing is determined to be performed. In response to this determination, the transfer data management table 63 for relating a data storage area on the defective HDD 31 (i.e., transfer source) to a data storage area on the backup HDD 33 (i.e., transfer destination) is created (step S23). The LBAs of locations accessed by the failed head are obtained, as information indicating the data transfer source, from the head number management table 61. FIG. 2 shows that LBAs corresponding to head number 0 on the HDD 31 are 0x00000000 through 0x000000FF. Therefore, LBAs 0x00000000 through 0x000000FF are stored in the transfer data management table 63. Moreover, LBAs 0x00000000 through 0x000000FF representing locations in an empty storage area on the backup HDD 33 are stored, as information indicating the data transfer destination, in the transfer data management table 63. FIG. 4B illustrates the resulting transfer data management table 63.

Next, data in the transfer source is transferred to the transfer destination (step S24). Here, data stored at the same LBAs as the LBAs corresponding to head number 0 on the HDD 31 is read from the HDD 32 and used as data in the transfer source.

Next, it is checked whether the reading of the data from the transfer source and the writing of the data to the transfer destination have been successful (step S25).

If they have been successful, the transfer processing ends. FIG. 6B illustrates data successfully transferred and stored on the HDD 33. After this transfer, data read/write processing in response to a command from the server 11 is performed on the HDD 31 and HDD 33.

If the reading of the data from the transfer source and the writing of the data to the transfer destination have failed, the entries in the transfer data management table 63 are cleared. Then, it is determined that a failure has occurred. The transfer processing is thus terminated (step S26). In this case, the failed device is replaced with a new one.

After the successful completion of data transfer, the access area transferred to the backup HDD 33 is used as part of data storage areas of the RAID array. On the other hand, access to the data storage area 0x00000000 through 0x000000FF on the HDD 31 in which a head failure has occurred is stopped after the data transfer.

In the reconfigured RAID 1 configuration, data is normally written to or read from the HDD 31 or HDD 33 in response to a command from the server 11. The HDD 31 stores data in the access area corresponding to head number 1, while the HDD 33 store data in the access area corresponding to head number 0. The HDD 32 serves as a mirror HDD.

Then, if there is an access from the server 11 and a read command for reading data at LB0 is received from the server 11, the main control unit 5 refers to the transfer data management table 63 and performs access to the storage area 0x00000000 on the HDD 33 (transfer destination) corresponding to data in the transfer source. In response to a read command from the server 11 for reading data at LB100, the main control unit 5 refers to the transfer data management table 63 in a similar manner. However, since no corresponding entry is found in the transfer data management table 63, the main control unit 5 performs access to the storage area 0x00000100 on the HDD 31.

Thus, time required for the recovery of a failed HDD becomes shorter than before, and degradation in the performance of a server connected to the RAID system can be minimized. Moreover, since a failed portion of the HDD can be retained, a HDD that requires replacement in the conventional RAID system can continue to be used, which contributes to reduced maintenance costs.

What is claimed is:

1. A Redundant Array of Independent Disks (RAID) controller for controlling multiple storage devices constituting a RAID array, the RAID controller comprising:
    a control unit to control the RAID controller according to a process including:
    determining whether an error detected during access to a storage device is a predetermined error;
    identifying a head of the error occurring upon determining the error being the predetermined error;
    obtaining an access area accessed by the identified head; and
    reconfiguring a RAID array by copying data in the obtained access area to a backup storage device.

2. The RAID controller according to claim 1, further comprising a memory for storing a correspondence table showing the correspondence of a head and logical block addresses representing locations in a data storage area on the storage devices, wherein the identifying comprises identifying a head on the basis of a logical block address at which an error has occurred by using the correspondence table.

3. The RAID controller according to claim 1, further comprising a memory for storing a correspondence table showing the correspondence of a head and logical block addresses representing locations in a data storage area on the storage devices, wherein the obtaining comprises obtaining a logical block address on the basis of the identified head by using the correspondence table.

4. The RAID controller according to claim 1, further comprising a memory, wherein the reconfiguring comprises creating a correspondence table showing the correspondence of logical block addresses representing locations in a data storage area on a copying source storage device and logical block addresses representing locations in a data storage area on a copying destination storage devices and storing the correspondence table in the memory.

5. The RAID controller according to claim 1, further comprising a memory for storing a correspondence table showing the correspondence of logical block addresses representing locations in a data storage area on a copying source storage device and logical block addresses representing locations in a data storage area on a copying destination storage device for backup, wherein when the RAID controller is accessed by a high-level device, the RAID controller selects storage devices reconfigured on the basis of the correspondence table.

6. The RAID controller according to claim 1, wherein the determining comprises determining that a failure has occurred if the number of times the predetermined error has occurred is equal to or larger than a threshold value.

7. A RAID system comprising:
multiple storage devices constituting a RAID array; and
a RAID controller for controlling the storage devices,
the RAID controller comprises:
a control unit to control the RAID controller according to a process including:
determining whether an error detected during access to a storage device is a predetermined error;
identifying a head of the error occurring upon determining the error being the predetermined error;
obtaining an access area accessed by the identified head; and
reconfiguring a RAID array by copying data in the obtained access area to a backup storage device.

8. A control method for a RAID controller for controlling multiple storage devices constituting a RAID array, the control method comprising:
determining step for determining whether an error detected during access to a storage device is a predetermined error;
head identifying step for identifying a head of the error occurring upon determining the error being the predetermined error;
access area obtaining step for obtaining an access area accessed by the identified head; and
reconfiguring step for reconfiguring a RAID array by copying data in the obtained access area to a backup storage device.

* * * * *